United States Patent [19]

Hayden

[11] Patent Number: 5,412,833
[45] Date of Patent: May 9, 1995

[54] WINDSHIELD WIPER ARM ADJUSTMENT CONNECTOR

[75] Inventor: William L. Hayden, Northville, Mich.

[73] Assignee: Ford Motor Company, Dearborn, Mich.

[21] Appl. No.: 318,933

[22] Filed: Oct. 6, 1994

[51] Int. Cl.⁶ .................................................. B60S 1/34
[52] U.S. Cl. ............................ 15/250.34; 15/250.31; 403/359; 403/4; 403/93; 74/522
[58] Field of Search ........... 15/250.34, 250.31, 250.35, 15/250.13; 403/359, 298, 3, 4, 93; 74/522

[56] References Cited

U.S. PATENT DOCUMENTS

| | | | |
|---|---|---|---|
| 2,376,714 | 5/1945 | Mussen | 403/359 |
| 2,642,611 | 6/1953 | Anderson | 15/250.34 |
| 2,738,535 | 3/1956 | Horton | 15/250.34 |
| 2,856,212 | 10/1958 | Sacchini | 15/250.34 |
| 2,971,785 | 2/1961 | Rorh | 15/250.34 |
| 3,161,902 | 12/1964 | Scinta | 15/250.34 |
| 3,602,937 | 9/1971 | Kelley | 15/250.34 |
| 4,161,798 | 7/1979 | Mohnach et al. | 15/250.34 |

Primary Examiner—David A. Scherbel
Assistant Examiner—Gary K. Graham
Attorney, Agent, or Firm—Donald A. Wilkinson; Roger L. May

[57] ABSTRACT

A windshield wiper assembly (18) includes a drive motor (20) linked to a pair of pivot shafts (30), each having a pivot axis (34). Mounted on each pivot shaft (30) is an adjustment connector (38). Each adjustment connector (38) includes a main cylindrical portion (42) concentric with pivot shaft (30), which includes a series of teeth (46), and an arcuate key portion (48) protruding from main cylindrical portion (42) opposite teeth (46). A wiper arm assembly (56), having a wiper arm head (62), installs onto adjustment connector (38). Wiper arm head (62) includes a main cylindrical recess (64) with a series of serrations (66) on its surface, at least one more than there are teeth (46), and a key arcuate recess (68) protruding from main recess (64). The key arcuate recess (68) aligns with key portion (48) during installation causing the center of rotation for orientation of wiper arm head (62) relative to adjustment connector (38) to be opposite teeth (46), creating a larger effective radius for adjustment, while maintaining the pivot axis for rotation at pivot axis (34).

12 Claims, 2 Drawing Sheets

WINDSHIELD WIPER ARM ADJUSTMENT CONNECTOR

FIELD OF THE INVENTION

The present invention relates to the installation of wiper arms onto vehicle windshield wiper assemblies and more particularly to the installation of wiper arms that allow for adjustment of orientation during installation.

BACKGROUND OF THE INVENTION

When assembling the components of a windshield wiper assembly on a vehicle, the proper orientation of each wiper arm assembly relative to its respective pivot shaft is important. The wiper arm assemblies need to be oriented correctly relative to their respective pivot shafts or, when operating, they can bang into the vehicle's cowl or A-pillar and scratch them. Further, in order to keep installation costs low, the wiper assembly must be easy and quick to assemble. A secure fit, without play in between the wiper arm assembly and pivot shaft, is also important for maintaining proper orientation during operation. And finally, any orientation mechanism needs to be small and light weight to minimize packaging concerns on the vehicle.

One common approach to orienting a wiper arm assembly relative to a pivot shaft during installation employs a cylindrical adjustment connector mounted directly on and concentric about the pivot shaft. This connector has teeth running longitudinally along its side, spaced around most, if not all, of its periphery. A mating wiper arm head, being part of the wiper arm assembly, includes a cylindrical recess with serrations that mate with the teeth when slipped onto the adjustment connector. Adjustment in orientation occurs by lifting the wiper arm head and rotating it relative to the adjustment connector about an axis through the center of the pivot shaft.

The tightness of fit is maintained by assuring that the diameter of the connector with teeth is close to the diameter of the wiper arm head recess with serrations. However, while the installation may be easy, it may not be quick since, due to the symmetry of the connector, the two mating parts allow for a full 360 degrees of orientation relative to one another. This allows for gross mis-orientations of the two parts, making it imperative that the technician assembling this know exactly what orientation that the pivot shaft is in. It typically requires that the wiper system be cycled and parked before the assembly can begin, adding more time to the wiper arm installation process.

Furthermore, with this configuration, the fineness of adjustment is determined strictly on the diameter of the connector and the spacing of the teeth around the periphery of the adjustment connector. Nonetheless, the adjustment connector and wiper arm head need to be small to meet weight and packaging requirements. If the diameter of the adjustment connector is kept small, then it may provide for too course of an adjustment for the size and spacing of the teeth, allowing for too wide of a range in adjustment when orientating the wiper arm assembly relative to the pivot shaft. On the other hand, if the teeth are correspondingly reduced in size to obtain a fine adjustment, the teeth are too small and consequently prone to damage. The torsional forces exerted between the adjustment connector and recess in the wiper arm head during wiper operation dictate a minimum acceptable size and spacing between adjacent teeth. Thus, in some applications there is a desire for the smaller increments of wiper arm orientation adjustment while maintaining ease of assembly and still meeting the minimum strength requirements of the teeth in a small space.

Some other current wiper arm attachment configurations, in an attempt to reduce the fineness of adjustment increments while maintaining an adequate tooth size, provide adjustment connectors that mount on the pivot shaft and are still generally cylindrical but have a significantly elongated portion with teeth on it. These connectors still rotate about the pivot shaft centerline for adjustment purposes, but have a longer radius where the teeth mate with the serrations of the wiper arm head due to the elongation. The rotational adjustment is still made by pivoting the wiper arm head relative to the adjustment connector about the axis of rotation of the pivot shaft in order to still assure a secure fit without looseness. This provides for a finer adjustment than the cylindrical connector for the same tooth size, but still significantly increases the connector size in the direction of the elongated teeth, increasing the overall space taken by the adjustment connector over the cylindrical connector and increasing packaging concerns.

Further, while some of these types of configurations limit the gross orientation of the wiper arm assembly relative to the pivot shaft, many of them still allow for a wide range of adjustments, making the first orientation upon assembly potentially inaccurate and increasing the total time taken for assembly.

SUMMARY OF THE INVENTION

In its embodiments, the present invention contemplates a windshield wiper adjustment connector assembly for use on a vehicle. The adjustment connector assembly comprises a pivot shaft mounted to the vehicle, having a pivot axis of rotation, and an adjustment connector. The adjustment connector is mounted on the pivot shaft at a predetermined orientation and includes a main portion generally concentric with the pivot axis. The adjustment connector also includes a secondary cylindrical portion protruding from the main portion having an adjustment axis spaced from and substantially parallel to the pivot axis. A plurality of spaced teeth running substantially parallel to the pivot axis opposite the secondary portion are also included on the main portion. The adjustment connector assembly also comprises a wiper arm head, with the wiper arm head having a main recess for receiving the main portion of the adjustment connector and a secondary cylindrical recess of substantially the same diameter as the secondary portion for receiving the secondary portion. The main recess includes a plurality of serrations aligned and spaced to mate with the teeth and has at least one more serration than teeth.

Accordingly, an object of the present invention is to provide a wiper assembly with an adjustment connector that allows for fine adjustment of its orientation during installation while minimizing the space taken for the adjustment connector.

It is an advantage of the present invention that fine angular adjustments in orientation of a wiper arm assembly relative to its pivot shaft can be made by an adjustment connector within a small space to improve packaging, while maintaining adequate tooth size.

It is a further advantage of the present invention that the above objects and advantages are accomplished while still preventing looseness between the adjustment connector and wiper arm head.

DETAILED DESCRIPTION OF THE PREFERRED EMBODIMENTS

Figure 1:
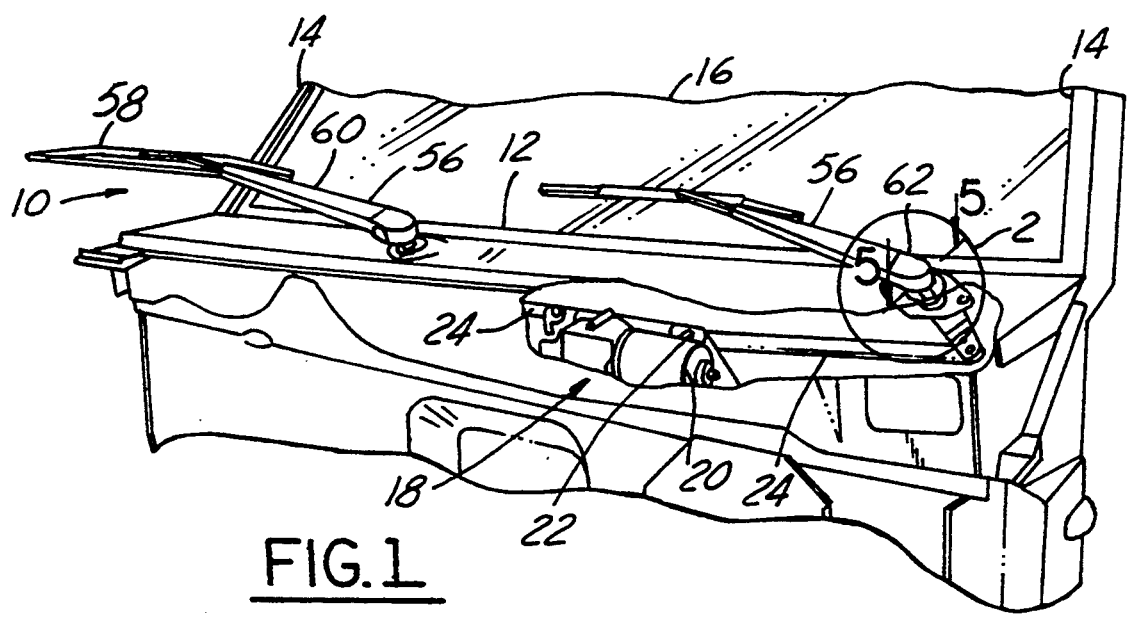
FIG. 1 is a partial perspective view of a vehicle cowl and a windshield wiper assembly.
Figure 2:
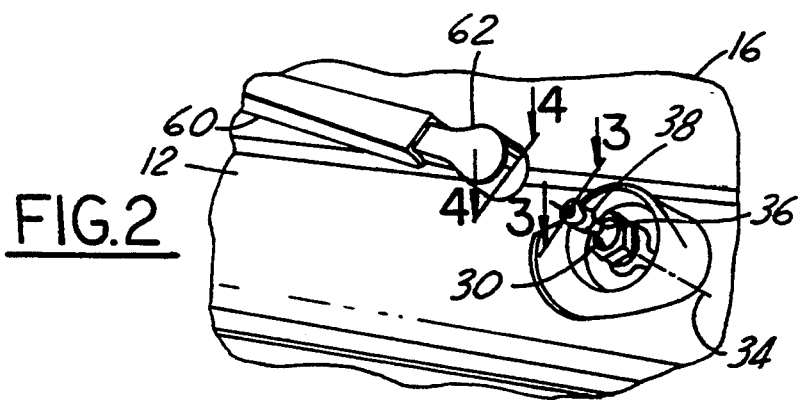
FIG. 2 is an enlarged partially exploded view of encircled area 2 in FIG. 1.
Figure 3:
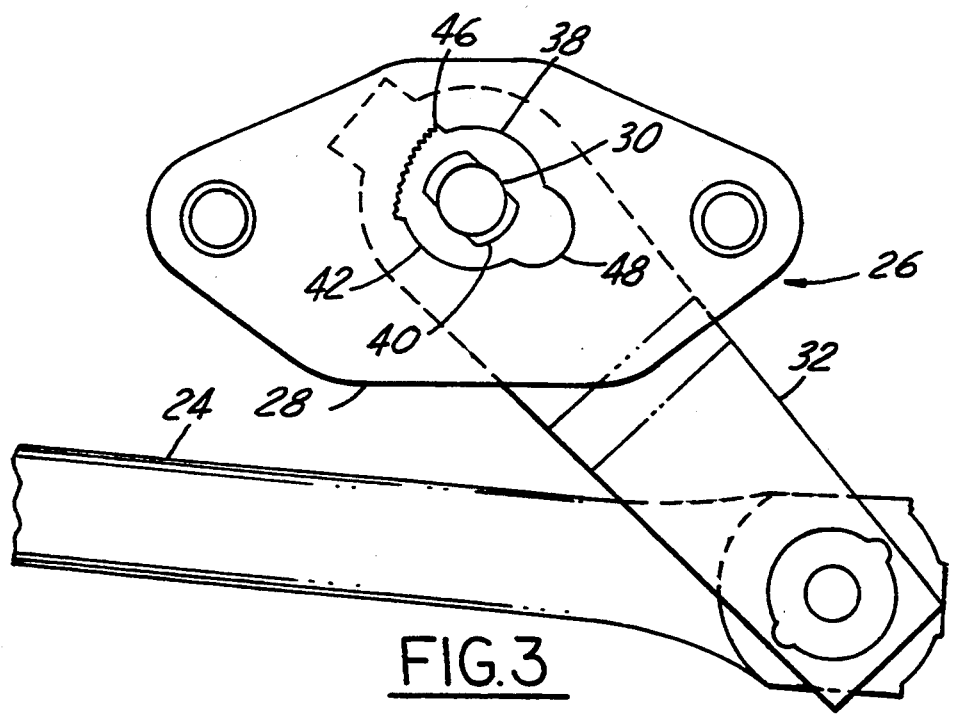
FIG. 3 is a view, on an enlarged scale, taken along line 3—3 in FIG. 2.
Figure 4:
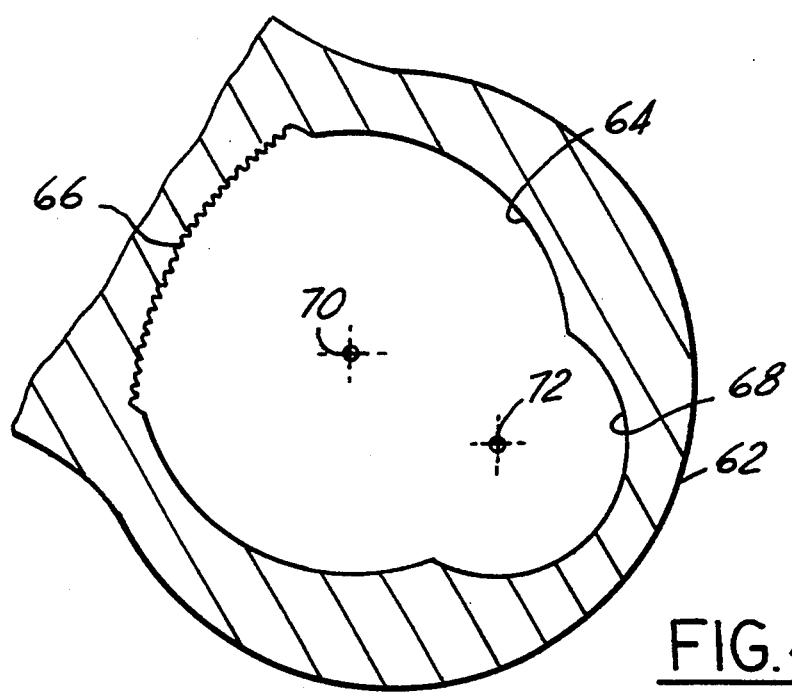
FIG. 4 is a sectional view, on an enlarged scale, taken along lines 4—4 in FIG. 2.
Figure 5:
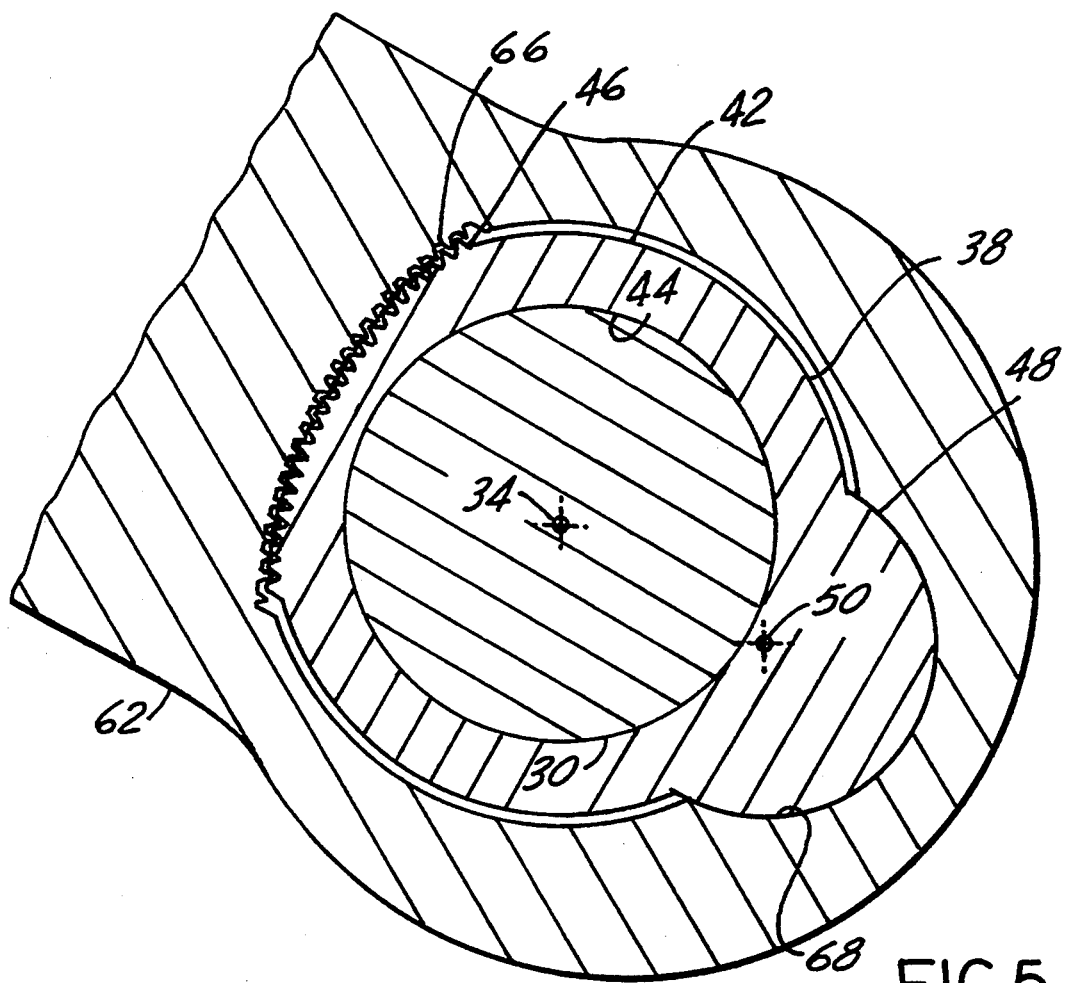
FIG. 5 is a sectional view, on an enlarged scale, taken along lines 5—5 in FIG. 1.

A typical vehicle 10 includes a cowl 12 attached to a pair of A-pillars 14, with a windshield 16 mounted to them. A windshield wiper assembly 18, for clearing windshield 16, is mounted to cowl 12. Windshield wiper assembly 18 includes a motor 20, having a linkage motor attachment 22. One end of each of a pair of linkage arms 24 are mounted to linkage attachment 22. The other end of each linkage arm 24 is pivotally coupled to a pivot assembly 26. Each pivot assembly 26 includes a mounting bracket 28 having a pivot shaft 30 rotatably mounted therein that is affixed to cowl 12 by a retainer nut 36. A connector 32 is coupled between each linkage arm 24 and its respective pivot shaft 30. As motor 20 drives linkage arms 24, they each, in turn, drive their respective pivot shafts 30 in a back-and-forth rotational motion about respective pivot axes 34, generally through a centerline of each pivot shaft 30.

Each pivot shaft 30 has an adjustment connector 38 mounted to it. The orientation of each adjustment connector 38 relative to its corresponding pivot shaft 30 is important for ensuring proper alignment of the wiper arm assemblies (discussed below) relative to windshield 16 each time the wiper arm assemblies need to be installed. The shape of each adjustment connector 38 is used to orient it angularly in relation to its pivot shaft 30, with each pivot shaft 30 already being positioned by holding certain wiper arm/pivot shaft assembly dimensions in an assembly fixture (not shown). A predetermined angular position dimension is controlled by this assembly fixture which locates the position of linkage motor attachment 22 in relation to pivot shaft axis 34. Adjustment connector 38 is then pressed onto pivot shaft 30 and staked 40 in place.

Adjustment connector 38 has a main cylindrical portion 42 that includes a bore 44, concentric with it, for receiving pivot shaft 30, as discussed above. This causes main cylindrical portion 42 to be centered about pivot shaft axis 34. A portion of the outer periphery of main cylindrical portion 42 has a series of teeth 46 running longitudinally.

Adjustment connector 38 also includes an arcuate key portion 48 protruding from main cylindrical portion 42. Preferably key portion 48 has at least 180 degrees of surface arc protruding from main cylindrical portion 42. The center 50 of the arc that forms the periphery of key portion 48 is spaced from pivot shaft axis 34. It is also opposite of pivot shaft axis 34 from teeth 46, preferably opposite the center of teeth 46. The tooth pitch radius is preferably centered on center 50.

One wiper arm assembly 56 is received on each adjustment connector 38. Each wiper arm assembly 56 includes a wiper blade assembly 58 mounted on a wiper arm 60, which is pivotally mounted to a wiper arm head 62.

Each wiper arm head 62 includes a main cylindrical recess 64 having a larger diameter than main cylindrical portion 42 of adjustment connector 38. Main recess 64 is concentric about a central axis 70. A portion of the surface of main recess 64 has serrations 66 that are of equal size and spacing as adjustment connector teeth 46. There is at least one more serration 66 than there are teeth 46, preferably two more. A secondary or key arcuate recess 68 is also included in wiper arm head 62. It protrudes from main recess 64 and is of substantially the same diameter as key portion 48 on adjustment connector 38. The center 72 of the arc that forms the periphery of recess 68 is spaced from central axis 70. It is also opposite central axis 70 from serrations 66.

To install wiper arm assembly 56 onto pivot shaft 30, wiper arm head 62 is aligned relative to adjustment connector 38 so that key portion 48 aligns with key recess 68 and teeth 46 align with serrations 66. Wiper arm head 62 is firmly pushed down on adjustment connector 38, so that serrations 66 of recess 64 and teeth 46 of adjustment connector 38 are in interlocking engagement, with teeth 46 preferably centered relative to serrations 66. Wiper blade assembly 58 is then lifted upward until a conventional retaining latch (not shown) snaps into place under adjustment connector 38. Wiper motor 20 can then be cycled to determine if the orientation of wiper arm assembly 56 relative to windshield 16 is correct. If not, then, wiper arm head 62 can be unlatched and removed, and re-inserted onto adjustment connector 38 with a new alignment of teeth 46 relative to serrations 66.

In the example illustrated herein, teeth 46 are spaced to allow for adjustments in increments of two degrees. With two more serrations 66 than teeth 46, the total range of adjustment is four degrees. Thus, the total range of four degrees precludes any final assembly error greater than two degrees beyond the designed nominal orientation. This allows for some minimal adjustment while preventing gross errors from occurring and eliminates the need to determine the exact orientation of pivot shaft 30 during the wiper arm installation process. This configuration creates a minimum adjustment system, although it could also be designed with additional serrations, if so desired, to allow for more overall adjustment flexibility.

In the installed position, since key recess 68 of wiper arm head 62 receives key portion 48 of adjustment connector 38 in a snug fit, i.e., no gap, it creates a rotational surface about an axis corresponding to center of key portion 50 and center of arc 72, which will align with one another. By placing the axes of rotation 50 and 72 for adjustment off-center to pivot shaft rotational axis 34, and opposite serrations 66, a larger effective radius of rotation is created. This allows adjustments to be made finer than a conventional cylindrical adjustment connector without reducing the teeth size and spacing and while fitting in substantially the same space as the conventional cylindrical configuration. Further, even though teeth 46 pivot about key center 50 rather than on pivot axis 34 for installation, the rotational center for operation of wiper arm assembly 56 is still substantially on pivot axis 34 since central axis 70 generally aligns with pivot axis 34.

Furthermore, even though a gap exists between main cylindrical portion 42 of adjustment connector 38 and main recess 64 of wiper arm head 62, a tightness of radial fit in all directions is maintained by the rotational surface of key recess 68, which is equal to or greater than 180 degrees, and serrations 66.

While certain embodiments of the present invention have been described in detail, those familiar with the art to which this invention relates will recognize various alternative designs and embodiments for practicing the invention as defined by the following claims.

I claim:

1. A windshield wiper adjustment connector assembly for use on a vehicle comprising:
    a pivot shaft rotatably mounted to the vehicle and having a pivot axis of rotation;
    an adjustment connector, mounted on and fixed to the pivot shaft at a predetermined orientation said adjustment connector including a main portion generally concentric with the pivot shaft, and a secondary portion protruding laterally from the main portion, said secondary portion being of arcuate form with a substantially constant radius about an adjustment axis which is spaced from and substantially parallel to the pivot axis, with the main portion also including a plurality of spaced teeth running substantially parallel to the pivot axis opposite the secondary portion; and
    a wiper arm head, with the wiper arm head having a main recess for receiving the main portion of the adjustment connector and a secondary arcuate recess of substantially constant radius having substantially the same radius as the secondary portion for receiving the secondary portion, with the main recess also including a plurality of serrations aligned and spaced to mate with the teeth and having at least one more serration than teeth to allow various connection orientations between the head and the adjustment connector about said adjustment axis.

2. An adjustment connector assembly according to claim 1 wherein the secondary portion of the adjustment connector fits flush against the secondary recess when received in the secondary recess.

3. An adjustment connector assembly according to claim 2 wherein the plurality of serrations includes two more serrations than the number of teeth in the plurality of teeth.

4. An adjustment connector assembly according to claim 3 wherein the spacing of the teeth is more than one but less than three degrees between each tooth.

5. An adjustment connector according to claim 4 wherein the secondary cylindrical recess is arcuate through 180 degrees or greater.

6. An adjustment connector according to claim 2 wherein the secondary cylindrical recess is arcuate through 180 degrees or greater.

7. An adjustment connector assembly according to claim 1 wherein the plurality of serrations includes two more serrations than the number of teeth in the plurality of teeth.

8. An adjustment connector according to claim 1 wherein the spacing of the teeth is greater than one and less than four degrees between each tooth, and the plurality of serrations includes two more serrations than the number of teeth in the plurality of teeth.

9. A windshield wiper assembly for use on a vehicle comprising:
    a drive mechanism mounted to the vehicle;
    a pair of pivot shafts, each said shaft coupled the drive mechanism and mounted for rotation about each having a pivot axis;
    a pair of adjustment connectors, each mounted on and fixed to its respective pivot Shaft at a predetermined orientation, with each said adjustment connector including a main portion generally concentric with the respect pivot shaft and a secondary portion protruding laterally from the main portion, said secondary portions being of arcuate form with a substantially constant radius about an adjustment axis which is spaced from and substantially parallel to its respective pivot axis, with each main portion also including a plurality of spaced teeth running substantially parallel to its respective pivot axis opposite the secondary portion; and
    a pair of wiper arm assemblies, each including a wiper arm head and a wiper arm pivotally mounted thereto, with each wiper arm head having a main recess for receiving the main portion of the adjustment connector and a secondary arcuate recess of substantially constant radius having substantially the same radius as the secondary portion for receiving its respective secondary portion in a tight fit, with the main recess also including a plurality of serrations aligned and spaced to mate with the teeth and each having at least one more serration than teeth to allow various connection orientations between the head and the adjustment connector about said adjustment axis.

10. A wiper assembly according to claim 9 wherein each of the plurality of serrations includes two more serrations than the number of teeth in its respective plurality of teeth.

11. A wiper assembly according to claim 10 wherein the spacing of the teeth is two degrees between each tooth.

12. A wiper assembly according to claim 11 wherein each of the secondary cylindrical recesses is arcuate through 180 degrees or greater.

* * * * *